United States Patent [19]

van der Zeeuw et al.

[11] 4,234,546
[45] Nov. 18, 1980

[54] LIQUID/LIQUID EXTRACTION OF NICKEL VALUES

[75] Inventors: Abraham J. van der Zeeuw; Peter Koenders; Riekert Kok, all of Amsterdam, Netherlands

[73] Assignee: Shell Oil Company, Houston, Tex.

[21] Appl. No.: 16,679

[22] Filed: Mar. 1, 1979

Related U.S. Application Data

[63] Continuation of Ser. No. 884,054, Mar. 6, 1978, abandoned.

[30] Foreign Application Priority Data

Mar. 7, 1977 [GB] United Kingdom ............... 9468/77

[51] Int. Cl.$^3$ .............................................. C01G 53/00
[52] U.S. Cl. .............................. 423/139; 75/101 BE; 423/DIG. 14; 564/265
[58] Field of Search ...................... 423/139, DIG. 14; 260/566 A; 75/101 BE

[56] References Cited

U.S. PATENT DOCUMENTS 3,703,573   11/1972   Blytas .................................. 423/139

FOREIGN PATENT DOCUMENTS 1322532   7/1973   United Kingdom ............ 423/DIG. 14

OTHER PUBLICATIONS

Stary, "The Solvent Extraction of Metal Chelates", Pergamon Press, N.Y., 1964, pp. 31-34, 37, 38, 101-103.
Peshkova et al., "Metody analiza redkikh i tsvetnykh metallov", MGU, Khimicheskiy Sakullet Kafidia anal. Khimii, 1956, pp. 3-14.

Primary Examiner—Herbert T. Carter

[57] ABSTRACT

A process is described for the selective recovery of nickel values from an aqueous solution containing nickel values by means of liquid/liquid extraction, wherein the aqueous solution is contacted with an organic extractant comprising a substantially water-immiscible organic solvent and one or more of certain alpha,beta-dioxime compounds. Novel alpha,beta-dioxime compounds for use in the extraction process are also described.

11 Claims, 1 Drawing Figure

LIQUID/LIQUID EXTRACTION OF NICKEL VALUES

This is a continuation of application Ser. No. 884,054, filed Mar. 6, 1978, now abandoned.

BACKGROUND OF THE INVENTION

This invention relates to the recovery of nickel values from an aqueous solution by means of a liquid/liquid extraction process employing certain alpha,beta-dioxime compounds as selective extraction agents. This invention also relates to novel alpha, beta-dioxime compounds.

One of the methods which can be used for accomplishing the recovery of nickel from ores comprises grinding the ore and then leaching the ground ore with an acidic aqueous solution. An acidic aqueous leachate is thus obtained which contains various metal ions. Selective recovery of nickel values from the leachate is subsequently achieved by contacting the aqueous metal value-containing solution with an organic extractant comprising an organic solvent and an extraction agent. The extraction agent is a ligand which forms chelate complexes with the nickel values, but preferably does not complex other metal values, such as cobalt and iron, which may also be present in the aqueous leachate. In such a process, the ligand and the ligand/nickel complexes must both be appreciably soluble in the organic solvent of the extractant, but not in water. Contact of the organic extractant with the aqueous leachate thus results in the selective transfer of nickel values into the extractant solution.

To be successful in application to commercial nickel extraction processes, the ligands must be able to complex with the nickel values both rapidly and completely. The rate of transfer of nickel values from an aqueous to organic phase in such an extraction process is conventionally expressed in terms of "extraction yield," which is defined by means of the following illustration. When an aqueous solution containing nickel values has been contacted, with agitation, for a period of, say, "t" minutes with the organic extractant, a sample is drawn from the mixture while agitation is continued. This sample is allowed to separate into an aqueous phase and an organic phase and the nickel content of the organic phase—indicated as "a" mg Ni/l—is determined. When, after prolonged agitation of the aqueous layer with the organic solution, equilibrium has been reached, the mixture is separated into an aqueous phase and an organic phase and the nickel content of the organic phase and an organic phase and the nickel content of the organic phase—indicated as "b" mg Ni/l—is determined. The extraction yield after t minutes' agitation, expressed as a percentage, is defined as $a/b \times 100$.

The extent to which nickel values in the aqueous solution are transferred into the extractant, expressed in terms of a "distribution coefficient", is also of importance. The distribution coefficient after t minutes' agitation is defined as $a/c$, wherein "a" is as defined hereinbefore and "c" is the nickel content of the aqueous phase, expressed in mg Ni/l. To be attractive for commercial nickel value extraction processes, a ligand must be able to produce both high extraction yields after a short extraction time and high distribution coefficients.

It is generally known to employ alpha,beta-dioxime compounds as ligands in liquid/liquid extraction processes for metal value recovery. However, known alpha,beta-dioximes have proven deficient for one or more reasons when applied for purposes of selective nickel value recovery. For instance, the process for nickel value extraction utilizing 4-alkyl-1,2-cyclohexanedione dioximes, as disclosed in U.S. Pat. No. 3,703,573 to G. C. Blytas, is concerned with simultaneous extraction of copper, cobalt, and nickel from an ore leachate. Selectivity with regard to nickel value recovery in such a process is provided by the formation of dioxime/nickel value complexes which are insoluble in the aqueous and the organic extraction phases. For selective recovery of only nickel values, it is most desirable that the extraction process yield a solution of the dioxime/nickel value complexes in the organic extraction phase, and not a precipitate. Otherwise the formation of a third, solid phase during liquid/liquid extraction complicates downstream processing operations for the eventual release of the nickel from the dioxime complexes. All but one of the dioxime ligands disclosed in the Blytas patent form insoluble nickel complexes. Furthermore, the distribution coefficients obtained using the extraction agents of U.S. Pat. No. 3,703,573 are unacceptable in a commercial sense, for it is shown that the percent of nickel values extracted is quite low in acidic extraction systems, i.e. 15% at pH=2, 58% at pH=4, and 80% at pH=6. In view of the fact that in commercial operations an acidic aqueous solution is generally used to initially leach nickel values from ores, there are definite advantages in being able to extract the nickel values from this leachate at low pH. If large amounts of alkaline matter must be added to the leachate for adjustment and control of the pH prior to extraction, cost and complexity of the process are thereby increased. The 4-alkyl-1,2-cyclohexanedione dioximes of U.S. Pat. No. 3,703,573 were also found to form complexes with both cobalt and iron at low pH; selective recovery of nickel values in the presence of cobalt and iron values is thus not possible when such ligands are employed in the extraction process.

A more recent investigation of the use of alpha,beta-dioximes for nickel value extraction is that of A. R. Burkin and J. S. Preston (J. Inorg. Nucl. Chem., 1975, Vol. 37, pp. 2187-2195), concerning symmetrical alpha,beta-alkanedione dioximes. These dioximes were found to provide for more selective extraction of nickel over cobalt and iron, and the dioxime/nickel complexes were soluble in the organic extractant. However, formation of cobalt (II) complexes was found to be irreversible. Furthermore, extraction of nickel values proceeded very slowly at low pH.

In view of the deficiencies of known alpha,beta-dioximes when applied to such liquid/liquid extraction processes, a dioxime compound able to provide for selective recovery of nickel in an extraction process characterized by high extraction yield after a short extraction time and high distribution coefficients at low pH would be highly desirable.

SUMMARY OF THE INVENTION

It has now been found that nickel values are recovered from aqueous solutions containing nickel values by means of a liquid/liquid extraction process utilizing an organic extractant comprising an organic solvent and, as active ligand for nickel value complex formation, an alpha,beta-dioxime of the formula

wherein A represents an aromatic group substituted with at least one organic group $R^2$, and $R^1$ represents an optionally substituted hydrocarbyl group or a hydrogen atom. The process may be efficiently employed at low pH to obtain recovery of nickel values in solution in the organic extractant phase. Moreover, the recovery is more selective than has heretofore been possible when the aqueous solution subjected to extraction also contains cobalt and iron values.

DESCRIPTION OF THE PREFERRED EMBODIMENTS

Suitable alpha,beta-dioximes for use in process of this invention are those represented by formula I above. The substituted aromatic group represented by A may be a carbocylic group or, alternatively, a heterocyclic group having a five-membered ring with aromatic characteristics. The carbocyclic and heterocyclic groups may be monocyclic or polycyclic. Examples are substituted aromatic groups derived from benzene (substituted phenyl groups), and substituted biphenyl, naphthalene, anthracene, thiophene, furan and benzothiophene groups. Very good results have been obtained with substituted phenyl groups.

The total number of carbon atoms in the organic group or groups $R^2$ and the number of carbon atoms in $R^1$ are not critical and may vary within wide limits. The number of carbon atoms in $R^2$ is preferably less than 25 and is in particular in the range from 7 to 20. The organic group or groups $R^2$ may be cyclic or acyclic and may contain substituents. $R^2$ may have hetero atoms interrupting the chain of carbon atoms. Acyclic $R^2$ groups are preferred; an acyclic group $R^2$ may have an unbranched or a branched chain of carbon atoms. Examples of acyclic groups are alkyl, alkenyl, alkapolyenyl, alkoxy, alkylthio and alkoxycarbonyl groups. Preference is given to those alpha,beta-dioximes of formula I wherein the organic group (or groups) $R^2$ is an alkyl group (or are alkyl groups). Examples of suitable alkyl groups are methyl, ethyl and propyl groups and unbranched alkyl groups having 3 to 25 carbon atoms and bound with a tertiary carbon atom to the aromatic nucleus in the substituted aryl group. A preferably, only one substituent $R^2$ is present, in which case the organic group $R^2$ is preferably connected to a ring carbon atom in the 4-position of a substituted phenyl group, the number 1 being assigned to the ring carbon atom to which the —C(=NOH)—C(=NOH)—$R^1$ group is attached.

The optionally substituted hydrocarbyl group $R^1$ in formula I may be, for example, an optionally substituted alkyl, aralkyl, cycloalkyl, aryl, alkaryl, alkenyl or alkapolyenyl group. The group represented by $R^1$ may carry non-hydrocarbyl substituents, for example, alkyloxy, alkylthio, aryloxy or alkoxy-carbonyl groups. $R^1$ preferably represents an alkyl group. Among these alkyl groups those with less than 10 carbon atoms are preferred. Excellent results have been obtained with alpha, beta-dioximes of the formula I in which $R^1$ represents a methyl group.

In nickel value extraction processes, very good results have been obtained with mixtures of 1-(4-alkylphenyl)-1,2-nonanedione dioximes, mixtures of 1-(4-alkylphenyl)-1,2-propanedione dioximes and mixtures of 2-(4-alkylphenyl)-2-hydroxyiminoethanal oximes, in which three mixtures the alkyl groups are a mixture of alkyl groups having an unbranched chain of 10 to 14 carbon atoms, said groups having been attached with a tertiary carbon atom to the aromatic nucleus by alkylation of benzene with a mixture comprising n-alkenes having 10 to 14 carbon atoms per molecule obtained by thermal cracking of petroleum wax comprising a mixture of n-alkanes. (Mixtures of alkylbenzenes obtained by alkylating benzene with these mixtures of n-alkenes having 10 to 14 carbon atoms per molecule are known under the trade name of "DOBANE JN".) Preparation of such dioxime compounds is accomplished by methods known to the art and is illustrated by Example I below. Other suitable alpha,beta-dioximes of formula I are mixtures of 1-(4-nonylphenyl)-1,2-alkanedione dioximes, in which the nonyl groups are a mixture of branched nonyl groups, which groups have been attached to the aromatic nucleus by alkylation of benzene with a mixture of branched nonenes obtained by trimerization of propylene.

The aromatic group A in formula I, substituted with at least one organic group $R^2$, may, if desired, be additionally substituted with one or more electron-attracting atoms or groups. These electron-attracting atoms and groups may be the same or different. Examples of electron-attracting substituents are halogen atoms, especially chlorine, bromine and fluorine atoms, nitro groups, cyano groups and alkoxycarbonyl groups C(O-)OR$^3$, in which $R^3$ represents an alkyl group having from 1 to 20 carbon atoms, such as methoxycarbonyl and ethoxycarbonyl groups.

The alpha,beta-dioximes of formula I exist in the anti, the syn, and—in the case of a symmetrical alpha,beta-dioxime—one amphi configuration, or—in the case of an asymmetrical alpha,beta-dioxime—two amphi configurations. For the definition of these configurations reference is made to *Methoden der Organischen Chemie,* (Houben-Weyl), Vol X/4 (1968), page 285. The use of the anti-configuration is preferred for the practice of this invention. Isolation of the anti isomer form the syn and amphi configurations is accomplished by methods well known in the art and is illustrated by Example II below.

While the aqueous solution containing nickel values may be an ammoniacal solution, it is preferably an acidic solution having a pH of at least 1.6. Most preferably the aqueous solution has a pH between 1.6 and 3.0. Operation of the nickel value extraction process of this invention at low pH has the advantage that little or no alkaline material must be added to the acidic ore leachate to increase pH prior to extraction. The concentration of the nickel values in the aqueous solution may vary between wide limits, and is generally between 0.0001 and 0.05 mol/liter. Favorable volume ratios of the organic extractant to the aqueous solution have been found to be between 1:3 and 3:1. However, ratios outside this range may prove useful as when, for instance, the concentration of nickel values in the aqueous solution is unusually high or low. It is commonly recognized that two moles of the dioxime ligand are required to complex one mole of nickel values. Determination of concentrations of ligand in the organic extractant, and of relative quantities of aqueous value-containing solution and extractant, for purposes of practicing this invention, should be made with this stoichiometric molar ratio in mind. Generally, the extraction process is carried out at a temperature in the range of 20° C. to 60° C. However, temperatures below 20° C. and higher than 60° C. are not precluded.

The mutual miscibility of the aqueous solution containing the nickel values and the substantially water-immiscible organic solvent preferably does not exceed 5 percent by volume (%v) and is preferably lower than 1% v. Suitable solvents are, for example, halogen-containing solvents, such as chlorinated hydrocarbons, e.g. chloroform, 1,2-dichloroethane and 1,2-dichloropropane, and chlorinated ethers, e.g. di(2-chloroethyl)ether, and hydrocarbon solvents, e.g. aromatic hydrocarbons, such as toluene, the xylenes and ethylbenzene.

The extracted nickel values may be recovered from the organic extract phase, subsequent to completion of the extraction process of this invention, by stripping the organic phase with a strongly acidic aqueous solution, thereby breaking the ligand/nickel complexes. Nickel values are thus transferred in the form of nickel salts to the aqueous stripping solution, from which they can be isolated, for example, as salts, by evaporation, or as elemental nickel, by electrolysis. The organic phase containing the released alpha,beta-dioximes is advantageously used again for subsequent extractions according to this invention.

The nickel value extraction process according to this invention is suitably carried out in any extraction equipment which provides sufficient contact between the organic extractant solution and the aqueous solution containing nickel values. Contactors and other equipment developed heretofore for use in metal value extraction processes employing dioxime or hydroxyoxime based extractants are particularly suitable. A multi-stage continuous countercurrent extraction is preferable, although the process of this invention may be operated in a batch mode or with a single contact stage. Agitation of the two phase-mixture is required in each extraction stage.

The process according to this invention is particularly useful for the recovery of nickel (II) values from aqueous solutions also containing iron (III) and cobalt (II) values.

The following examples further illustrate the invention. These examples are intended to set out the general principles of this invention and are not to be construed as limiting its scope.

Examples III–XII and Comparative Experiments I–III are nickel-value extractions carried out in a 250 ml double-walled cylindrical glass vessel having an internal diameter of 7 cm. The temperature in the vessel was held constant by circulating water through the space between the outer and the inner walls of the vessel. The vessel was provided with an inlet tube, a sampling cock at the bottom, a six-bladed turbine stirrer with a distance between the ends of the opposite tips of 2.8 cm, and four baffles, connected to the wall of the vessel and extending to the central axis over a distance of 0.7 cm. The stirrer speed was 2000 revolutions per minute.

The organic extractants utilized in the Examples consisted of an organic solvent and a mixture of alpha,beta-dioximes. The four dioxime mixtures tested in the Examples are described and given convenient letter designations in Table I. Comparative Experiments were carried out using a symmetrical alpha,beta-dioxime, designated A in Table I, which was investigated as a ligand in nickel value extractants by Burkin and Preston (referenced above).

TABLE I

| Dioxime or mixture of dioximes | Designation |
|---|---|
| 8,9-hexadecanedione dioxime; 100% anti configuration | A |
| mixture of 2-(4-$C_{10-14}$-alkylphenyl)-2-hydroxyiminoethanal oximes; 60% anti configuration | B |
| mixture of 1-(4-$C_{10-14}$-alkylphenyl)-1,2-propanedione dioximes; 92% anti configuration | $C_1$ |
| mixture of 1-(4-$C_{10-14}$-alkylphenyl)-1,2-propanedione dioximes; 65% anti configuration | $C_2$ |
| mixture of 1-(4-$C_{10-14}$-alkylphenyl)-1,2-nonanedione dioximes; 76% anti configuration | D |

The mixtures of $C_{10-14}$-alkyl groups in each of dioximes B, $C_1$, $C_2$ and D have the same composition; these alkyl groups have been attached with a tertiary carbon atom to the aromatic nucleus by alkylation of benzene with a mixture comprising n-alkenes having 10 to 14 carbon atoms per molecule obtained by thermal cracking of petroleum wax comprising a mixture of n-alkanes. The mixture of $C_{10-14}$-alkyl groups has the following composition (in percent by weight):

$C_{10}$: 13%
$C_{11}$: 25%
$C_{12}$: 25%
$C_{13}$: 24%
$C_{14}$: 12%

The alkyl groups are unbranched and 20% of them are 1-methylalkyl groups.

EXAMPLE I

Preparation of a mixture of the alpha,beta-dioxime compounds 2-(4'-$C_{10-14}$-alkylphenyl)-2-hydroxyiminoethanal oximes, designated B in Table I, corresponding to the simplified formula II

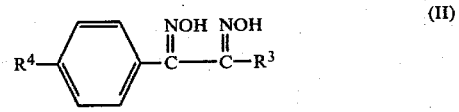

(II)

wherein $R^3$ is a hydrogen atom and $R^4$ is a mixture of $C_{10-14}$ alkyl groups as described above, is illustrated by the following three-step procedure.

(1) Preparation of a mixture of 4' alkylacetophenones having a mixture of straight alkyl groups with 10 to 14 carbon atoms. A mixture of 1 mol of "Dobane JN", 200 ml of tetrachloroethylene, and 1 mol of powdered aluminum trichloride was cooled to −10° C. (Mixtures of alkylbenzenes obtained by alkylating benzene with mixtures of n-alkenes having 10–14 carbon atoms per molecule, said mixture being derived from the thermal cracking of petroleum wax, are commonly known under the trademark "Dobane JN".) Then 1.05 mole of acetyl chloride was added dropwise to the mixture with vigorous stirring, the temperature being kept below 0° C. After completion of the acetyl chloride addition, the mixture was poured into 300 ml of 2 N aqueous hydrochloric acid, the mixture thus formed was separated into an aqueous and an organic phase, the aqueous phase was extracted with two 100 ml portions of n-hexane, the combined extract phases were washed with two 100 ml portions of water, with 200 ml of a 0.5 M aqueous solution of sodium carbonate and with 200 ml of water, the washed organic phase was dried over anhydrous sodium sulphate and the dried organic phase was distilled at sub-atmospheric pressure to leave a very pale yellow residue. This residue consisted of the desired mixture of acetophenones, which was obtained in quantitative yield.

(2) Preparation of a mixture of 2-(4-alkylphenyl)-2-oxoethanol oximes having a mixture of straight alkyl groups with 10 to 14 carbon atoms. A solution of 0.1 mol of the mixture of alkylacetophenones prepared in step (1) in 100 ml of diethyl ether was saturated with gaseous hydrogen chloride of atmospheric pressure at a temperature between 0° and 10° C. Then 0.1 mol of isopropyl nitrite was added dropwise to the solution with stirring was continued for two hours at a temperature between 0° and 10° C. The reaction mixture thus formed was washed with two 25 ml portions of water, the diethyl ether was evaporated from the washed mixture, and the residue thus obtained was poured into 150 ml of a 5 percent by weight (%w) solution of sodium hydroxide in a mixture consisting of 50% v of water and 50% v of ethanal. The solution thus obtained was extracted with two 50 ml portions of n-pentane to remove any unconverted 4'-$C_{10-14}$-alkylacetophenone. An amount of 2 N aqueous sulphuric acid sufficient to decrease the pH of the extracted aqueous solution to a value of 2 was added and then the mixture was extracted with two 100 ml portions of diethyl ether. The ethereal phase was dried over anhydrous sodium sulphate and the dried ethereal phase was distilled to leave a residue having a content of the mixture of the desired 2-oxoethanol oximes of more than 95%. The yield of these oximes was 85%, calculated on the starting amount of 4'-alkylacetophenones.

(3) Preparation of a mixture of 2-(4-$C_{10-14}$-alkylphenyl-2-hydroxyiminoethanal oximes. A flask was provided with 0.1 mol of the mixture of 2-oxoethanal oximes present in the residue prepared in step (2), 0.05 of hydroxylamine sulphate, 0.1 mol of sodium acetate 3$H_2O$ and 100 ml of a mixture of 96% v ethanol and 4% v water. Then the mixture in the flask was heated under reflux for a period of four hours. After this period ethanol was distilled off at subatmospheric pressure, the residue formed was mixed with 100 ml of water and 100 ml of diethyl ether, the mixture was allowed to separate into an aqueous and an ethereal layer, the ethereal layer was isolated and the acetic acid was removed by washing with two 50 ml portions of water, the acid-free ethereal solution was dried over sodium sulphate and the dried ethereal solution was distilled at sub-atmospheric pressure to leave a residue consisting of the mixture of 2-hydroxyiminoethanal oximes, which was obtained in quantitative yield. Analysis by means of high-pressure liquid chromatography showed that these dioximes consisted of a mixture of their syn, anti and amphi forms.

EXAMPLE II

The mixture of 2-(4-$C_{10-14}$-alkylphenyl)-2-hydroxyiminoethanal oximes prepared according to Example I was treated to isolate the anti configuration of the dioximes via the following procedure. An amount of 0.1 mol of the mixture of dioximes prepared in step (3) of Example I was stirred for 30 minutes with 200 ml of n-heptane at a temperature of 50° C. At the end of this period a suspension was present which was separated by filtration into solid material and a solution in n-heptane. The solid material was an almost pure mixture of the desired anti 2-hydroxyiminoethanal oximes, obtained in a yield of 60%, calculated on the starting amount of dioximes.

EXAMPLES III–V

These Examples show that the distribution coefficients obtained according to the process of this invention are higher than those obtained when nickel value extraction is carried out using an extractant comprising a symmetrical alpha,beta-dioxime at the same pH.

The starting organic extractant in Examples III–V consisted of a mixture of dioximes in a concentration of the anti configuration of 0.005 mol/l dissolved in toluene solvent. 100 ml of the starting organic extractant was introduced into the cylindrical vessel, the blades of the stirrer were positioned at the surface of the organic solution, stirring was started, and 100 ml of the starting aqueous solution was poured into the vessel. In Examples III–V and Comparative Experiment I, the starting aqueous solution had a pH of 2.0 and contained 0.0005 mol/l of the sulphate of nickel (II) and 0.5 mol/l of the sulphate of sodium. The temperature of the batch extraction mixture was held at 50° C. When equilibrium was reached, stirring was discontinued, the two phases were allowed to separate and the concentrations of the nickel in the organic phase and in the aqueous phase were determined. Subsequently, the pH of the aqueous phase was slightly increased by adding a small amount of 25% w aqueous ammonia. Stirring was again started and continued until equilibrium was attained at the higher pH. The two phases were allowed to separate and the concentrations of the nickel in the organic phase and in the aqueous phase were again determined. The procedure was continued in this manner to obtain equilibrium distribution coefficient data at several pH values.

Three mixtures of dioximes (B, C, and D) suitable for practice of this invention were tested in this manner. Table II presents the logarithms of the nickel value extraction distribution coefficients (log D) found at various pH values. The results of Comparative Experiment I, carried out with dioxime A according to the same general procedures used for the examples, are included for comparison.

TABLE II

| Comparative Experiment 1 | | Example 3 | | Example 4 | | Example 5 | |
|---|---|---|---|---|---|---|---|
| Dioxime A | | Dioximes B | | Dioximes $C_1$ | | Dioximes D | |
| pH | log D | pH | log D | pH | log D | pH | log D |
| 1.58 | −0.70 | 1.36 | −0.38 | 1.42 | −0.30 | 1.60 | 0.14 |
| 1.89 | −0.22 | 1.70 | 0.12 | 1.66 | 0.10 | 2.08 | 0.87 |
| 2.04 | 0.18 | 2.10 | 0.82 | 2.00 | 0.80 | | |
| 2.70 | 1.19 | 2.66 | 1.84 | 2.55 | 1.76 | | |

BRIEF DESCRIPTION OF THE DRAWING

The data presented in Table II is also shown in FIG. 1, which more clearly illustrates the superior performance of the extraction process according to this invention.

EXAMPLES VI-IX

Figure 1:
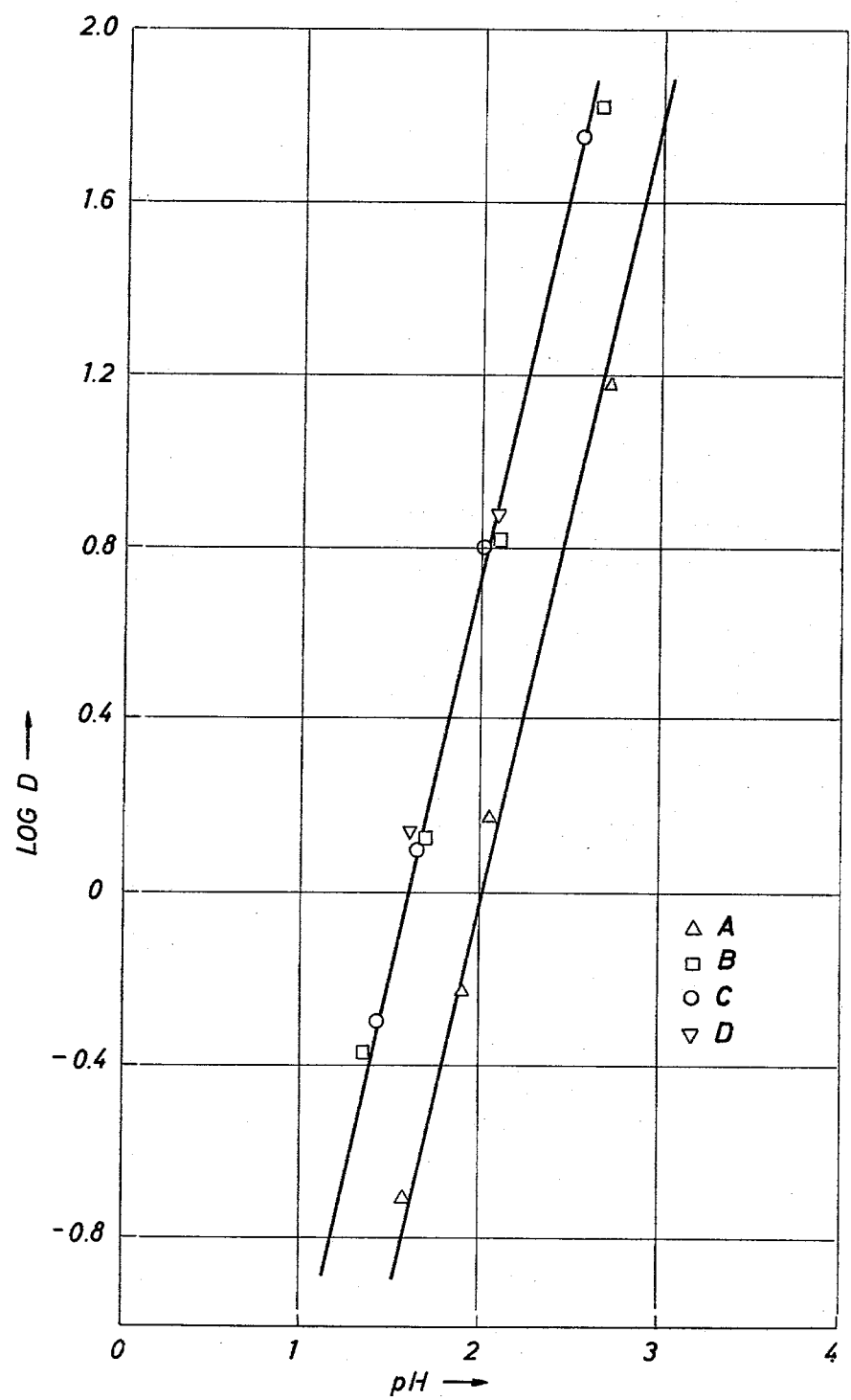
In FIG. 1 the pH and the log D parameters have been set out along the horizontal and vertical axes, respectively. The values for log D and pH presented in Table II have been plotted and are indicated with four different marks, each of which relates to one dioxime or one mixture of dioximes as indicated in the figure. A straight line has been drawn through each set of marks thus obtained for one dioxime or mixture of dioximes. The lines for dioxime mixtures B, C, and D coincide.

These Examples show that when nickel value extraction is practiced according to this invention, employing an extractant comprising an aromatic hydrocarbon as the organic solvent, high extraction yields are realized after short extraction times.

100 ml of the starting organic solution, which consisted of toluene and a mixture of dioximes in a concentration of the anti configuration of 0.005 mol/l, was introduced into the cylindrical vessel, the blades of the stirrer were positioned at the surface of the organic solution, stirring was started and 100 ml of the starting aqueous solution was poured into the vessel. For Examples VI-IX and Comparative Experiment II, the starting aqueous solution had a pH of 3.0 and contained 0.0129 mol/l of the sulphate of nickel (II). The temperature was kept at 50° C. At various time intervals a sample was drawn from the mixture while stirring was continued. After separation of the layers of the sample, the nickel content of the organic layer was determined. When stirring had been continued for a total of two hours, the mixture was taken to be in equilibrium and stirring was stopped. The two phases in the vessel were allowed to separate and the nickel content of the organic phase was determined, followed by calculation of the extraction yield.

Four mixtures of dioximes were tested in this manner. Table III presents the extraction yield results found after the extraction times stated. The data of Comparative Experiment II, carried out with dioxime A in a comparable manner, have been included for comparison.

TABLE III

| Dioxime or mixture of dioximes | A | B | $C_1$ | $C_2$ | D |
|---|---|---|---|---|---|
| | Extraction yield %, in | | | | |
| Extraction time, min | Comparative experiment II | | Examples | | |
| | | IV | V | VI | VII |
| 0.5 | 5 | 20 | 48 | 25 | 20 |
| 1.0 | 9 | 33 | 65 | 38 | 33 |
| 1.5 | 13 | 43 | 76 | 54 | 43 |
| 2.0 | 17 | 53 | 81 | 64 | 54 |
| 3.0 | 23 | 64 | 87 | 74 | 65 |
| 5.0 | 33 | 77 | 95 | 87 | 77 |
| 10.0 | 54 | 84 | 97 | 94 | 84 |

EXAMPLE X

This Example shows that when nickel value extraction is practiced according to this invention, employing an extractant comprising a chlorinated hydrocarbon as the organic solvent, high extraction yields are realized after short extraction time.

100 ml of the starting organic solution, which consisted of chloroform and the dioxime mixture of $C_2$ in a concentration of the anti configuration of 0.03 mol/l, was introduced into the cylindrical vessel, the blades of the stirrer were positioned at the surface of the organic solution, stirring was started and 100 ml of the starting aqueous solution was poured into the vessel. The starting aqueous solution employed in Example X and Comparative Example III had a pH of 1.5 and contained 0.01 mol/l of the sulphate of nickel (II), 0.01 mol/l of the sulphate of iron (III), and 0.5 mol/l of the sulphate of sodium. Temperature of the batch extraction was held at 30° C. The general procedures of Examples VI-IX were otherwise followed. Table IV presents the results of Example X and of Comparative Experiment III, carried out in the same general manner but utilizing dioxime A.

TABLE IV

| Dioxime or mixture of dioximes | A | $C_2$ |
|---|---|---|
| | Extraction yield, %, in | |
| Extraction time min. | Comparative Experiment III | Example X |
| 1 | 3 | 15 |
| 2 | 5 | 24 |
| 3 | 7 | 31 |
| 4 | 9 | 38 |
| 5 | 11 | 43 |
| 10 | 19 | 60 |
| 15 | 27 | 70 |
| 30 | 49 | 84 |

EXAMPLE XI

This Example shows that the process of this invention is particularly useful for the selective extraction of nickel values from an aqueous solution containing both nickel (II) and iron (III) values.

100 ml of the starting organic solution, which consisted of chloroform and dioxime mixture $C_2$ in a concentration of the anti configuration of 0.03 mol/l, was introduced into the cylindrical vessel, the blades of the stirrer were positioned at the surface of the organic solution, stirring was started and 100 ml of the starting aqueous solution was poured into the vessel. The starting aqueous solution was the same as that employed in Example X. The temperature of the extraction system was maintained at 30° C. Otherwise, the general procedures of Examples III-V were utilized. Results are presented in Table V.

TABLE V

| | Distribution coefficient of | |
|---|---|---|
| pH | nickel (II) | iron (III) |
| 1.48 | 1.51 | 0.0007 |
| 1.87 | 9.71 | 0.0017 |
| 2.27 | 52.5 | 0.0035 |
| 2.48 | 117 | 0.0056 |

EXAMPLE XII

This Example shows that the process of this invention is particularly useful for the selective extraction of nickel values from an aqueous solution containing both nickel (II) and cobalt (II) values.

100 ml of the starting organic solution, which consisted of chloroform and dioxime mixture $C_2$ in a concentration of the anti configuration of 0.03 mol/l, was introduced into the cylindrical vessel, the blades of the stirrer were positioned at the surface of the organic solution, stirring was starting and 100 ml of the starting aqueous solution was poured into the vessel. The starting aqueous metal value-containing solution for this Example had a pH of 1.5 and contained 0.01 mol/l of the sulphate of nickel (II), 0.01 mol/l of the sulphate of cobalt (II) and 0.5 mol/l of the sulphate of sodium. The temperature was held at 40° C. Otherwise the general procedures of Examples III-V were again followed. Results are presented in Table VI.

TABLE VI

| | Distribution coefficient of | |
|---|---|---|
| pH | nickel (II) | cobalt (II) |
| 1.50 | 1.86 | 0.03 |
| 1.85 | 3.25 | 0.07 |

TABLE VI-continued

| pH | Distribution coefficient of nickel (II) | cobalt (II) |
| --- | --- | --- |
| 2.20 | 6.38 | 0.46 |

What is claimed is:

1. The liquid/liquid extraction process for the separation of nickel values from an aqueous solution containing nickel values and having a pH between 1.6 and 3.0 which comprises contacting the aqueous solution with an organic extractant comprising a substantially water-immiscible organic solvent and one or more alpha, beta-dioxime compounds of the general formula I

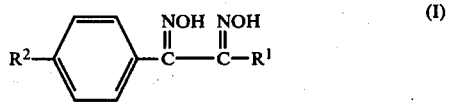

where $R^2$ represents an alkyl group of from 7 to 20 carbon atoms, and $R^1$ represents an alkyl group having less than ten carbon atoms or a hydrogen atom, thereby forming an organic extract phase containing nickel values in solution and an aqueous raffinate phase.

2. The process of claim 1, wherein the alpha, beta-dioximes of formula I are substantially in the anti isomer configuration.

3. The process of claim 2, wherein the alpha,beta-dioximes are a mixture of 1-(4-alkylphenyl)-1,2-propanedione dioximes, in which the alkyl groups are a mixture of alkyl groups having a straight chain of 10 to 14 carbon atoms, which groups have been attached with a tertiary carbon atom to the aromatic nucleus by alkylation of benzene with a mixture comprising n-alkenes having 10 to 14 carbon atoms per molecule obtained by thermal cracking of petroleum wax comprising a mixture of n-alkanes.

4. The process of claim 2, wherein the alpha,beta-dioximes are a mixture of 1-(4-alkylphenyl)-1,2-nonanedione dioximes in which the alkyl groups are a mixture of alkyl groups having a straight chain of 10 to 14 carbon atoms, which groups have been attached with a tertiary carbon atom to the aromatic nucleus by alkylation of benzene with a mixture comprising n-alkenes having 10 to 14 carbon atoms per molecule obtained by thermal cracking of petroleum wax comprising a mixture of n-alkanes.

5. The process of claim 2, wherein the alpha,beta-dioximes are a mixture of 2-(4-alkylphenyl)-2-hydroxyiminoethanal oximes, in which the alkyl groups are a mixture of alkyl groups having a straight chain of 10 to 14 carbon atoms, which groups have been attached with a tertiary carbon atom to the aromatic nucleus by alkylation of benzene with a mixture comprising n-alkenes having 10 to 14 carbon atoms per molecule obtained by thermal cracking of petroleum wax comprising a mixture of n-alkanes.

6. The process of claim 2, wherein the liquid/liquid extraction is carried out at a temperature in the range from 20° C. to 60° C.

7. The process of claim 6, wherein the substantially water-immiscible organic solvent comprises an aromatic hydrocarbon.

8. The process of claim 7, wherein the aromatic hydrocarbon is toluene.

9. The process of claim 6, wherein the substantially water-immiscible organic solvent comprises a chlorinated hydrocarbon.

10. The process of claim 9, wherein the chlorinated hydrocarbon is chloroform.

11. The process of claim 6, wherein the acidic aqueous solution containing nickel values also contains iron (III) values.